United States Patent [19]
Gracey et al.

[11] Patent Number: 6,133,206
[45] Date of Patent: Oct. 17, 2000

[54] LUBRICATING OIL ADDITIVES

[75] Inventors: Benjamin Patrick Gracey, Hull; David John Moreton, East Yorkshire, both of United Kingdom

[73] Assignee: Lubrizol Adibis Holdings (UK) Ltd., Merseyside, United Kingdom

[21] Appl. No.: 09/104,971

[22] Filed: Jun. 26, 1998

[30] Foreign Application Priority Data

Apr. 4, 1997 [GB] United Kingdom .................. 9714069

[51] Int. Cl.$^7$ .................. C10M 149/18; C10M 149/22; C08F 8/32

[52] U.S. Cl. .................. 508/221; 508/452; 508/454; 525/329.5; 525/327.6; 548/547

[58] Field of Search .................. 508/452, 454, 508/221; 525/327.6, 329.5, 222, 298, 301; 548/547

[56] References Cited

U.S. PATENT DOCUMENTS

| | | | |
|---|---|---|---|
| 4,184,993 | 1/1980 | Singh et al. | 260/31.2 R |
| 4,399,248 | 8/1983 | Singh et al. | 524/205 |
| 5,567,344 | 10/1996 | Emert et al. | 508/452 |
| 5,578,237 | 11/1996 | Emert et al. | 508/454 |

FOREIGN PATENT DOCUMENTS

| | | |
|---|---|---|
| 682102 | 1/1995 | European Pat. Off. . |
| 733696 | 3/1996 | European Pat. Off. . |
| 842956 | 11/1997 | European Pat. Off. . |
| 19508655 | 3/1995 | Germany . |
| 95/07944 | 3/1995 | WIPO . |
| 9507944 | 3/1995 | WIPO . |
| 9640846 | 12/1996 | WIPO . |

OTHER PUBLICATIONS

EP 98 30 4969; European Search Report mailed Mar. 4, 1999.

*Primary Examiner*—Margaret Medley
*Attorney, Agent, or Firm*—Michael Esposito

[57] ABSTRACT

A compound comprising i) 20–80 mol % of at least one monoethylenically unsaturated dicarboxylic acid or anhydride thereof, ii) 5–30 mol % of at least one unsaturated oligomer of an optionally branched olefin having 2 to 20 carbon atoms, having an average molecular weight Mw of 300–5000, iii) 10–60 mol % of an ethylenically unsaturated acid having at least 10 carbon atoms, or a mono-,di- or tri-ester of glycerol (1, 2, 3 propanetriol) in which at least one of the carboxylic acid residues of the ester is derived from said ethylenically unsaturated acid, or an oil, optionally hydrolysed, containing at least 30 wt % of the acid or ester is disclosed, which has both dispersant and VI improving properties in lubricating oils.

9 Claims, No Drawings

LUBRICATING OIL ADDITIVES

The present invention relates generally to additives for use in lubricating oil compositions and to processes for producing the aforesaid additives. In particular, the present invention relates to additives for use as dispersants having viscosity index improver properties.

Operation of internal combustion engines is accompanied by the formation of piston varnish and sludge in the crankcase and in the oil passages of the engine.

The sludge and varnish seriously restrict the ability of the crankcase oil to satisfactorily lubricate the engine. Furthermore, the sludge with its entrapped water tends to contribute to rust formation in the engine. To combat the varnish and sludge in internal combustion engines it has long been the practice to incorporate into the lubricating oil additives in the form of dispersants. The dispersants function to disperse the components of varnish and sludge throughout the oil and thereby prevent their accumulation.

More recently, the operating demands placed on internal combustion engines have led to a desirability for the dispersant additive to make a viscosity index improver contribution to the additive package sufficient to permit elimination of all or a significant amount of the viscosity index improver additive conventionally employed in such packages. In addition to reducing costs, this also reduces the potential for sludge formation in the oil, as the breakdown products of VI improvers are known to be a major component of engine oil sludge.

WO 95/07944 discloses that dispersants having a VI improving effect can be obtained by reacting an amine with a terpolymer which comprises
a) 20–60 mol % of at least one monoethylenically unsaturated dicarboxylic acid or anhydride thereof,
b) 10–70 mol % of at least one oligomer of propene or of a branched olefin having 4 to 10 carbon atoms, having an average molecular weight Mw of 300–5000; and
c) 1–50 mol % of at least one monoethylenically unsaturated compound which is copolymerizable with the monomers a) and b).

We have now found that the reaction product of an amine, particularly a succinimide, with a different novel terpolymer provides excellent dispersancy with VI improvement.

Accordingly in a first aspect the present invention provides an additive for lubricating oil compositions, which comprises the reaction product of
(A) an amine of the formula $HNR^1R^2$, where $R^1$ and $R^2$ are each independently H, an aliphatic or aromatic hydrocarbon radical, an aminoalkylene or polyaminoalkylene radical, a hydroxyalkylene radical, a polyoxyalkylene radical optionally carrying terminal amino groups, or a heteroaryl or heterocyclyl radical optionally carrying terminal amino groups; or, together with the N to which they are bonded, $R^1$ and $R^2$ form a ring optionally containing further heteroatoms; or the reaction product of said amine with an acyclic hydrocarbyl substituted succinic acylating agent;
(B) a polymer comprising
  i) 20–80 mol % of at least one monoethylenically unsaturated dicarboxylic acid or anhydride thereof,
  ii) 5–30 mol % of at least one unsaturated oligomer of an optionally branched olefin having 2 to 20 carbon atoms, having an average molecular weight Mw of 300–5000,
  iii) 10–60 mol % of an ethylenically unsaturated acid having at least 10 carbon atoms, or a mono-,di- or tri-ester of glycerol (1, 2, 3 propanetriol) in which at least one of the carboxylic acid residues of the ester is derived from said ethylenically unsaturated acid, or an oil, optionally hydrolysed, containing at least 30 wt % of the acid or ester.

A further aspect of the invention provides a polymer comprising
  i) 20–80 mol % of at least one monoethylenically unsaturated dicarboxylic acid or anhydride thereof,
  ii) 5–30 mol % of at least one unsaturated oligomer of an optionally branched olefin having 2 to 20 carbon atoms, having an average molecular weight Mw of 300–5000,
  iii) 10–60 mol % of an ethylenically unsaturated acid having at least 10 carbon atoms, or a mono-,di- or tri-ester of glycerol (1, 2, 3 propanetriol) in which at least one of the carboxylic acid residues of the ester is derived from said ethylenically unsaturated acid, or an oil, optionally hydrolysed, containing at least 30% of the acid or ester.

The invention also includes within its scope lubricating oils containing the above reaction product of amine (A) and polymer (B), and the use of said reaction product to improve the viscometric properties of lubricating oils.

The amine (A) of the additive is preferably a succinimide, particularly one prepared from an acyclic hydrocarbyl substituted succinic acylating agent and a polyamine, the hydrocarbyl substituted succinic acylating agent being prepared by reacting a polyolefin and an acylating agent under conditions such that at least 75 mole %, preferably that at least 80 and more preferably at least 85 mole % of the starting polyolefin is converted to the hydrocarbyl-substituted succinic acylating agent.

The acyclic hydrocarbyl substituent of the succinic acylating agent may suitably be either an alkyl or alkenyl group, preferably an alkyl group. The substituent is suitably derived from a polyolefin homopolymer or copolymer having a number average molecular weight in the range from about 500 to about 5000, typically from 750 to 1500. The olefin suitably has from 2 to 16 carbon atoms, preferably from 2 to 6 carbon atoms. The copolymers include random, block and tapered copolymers. Suitable olefin monomers include ethylene, propylene, butenes, isobutene and pentenes. The acyclic hydrocarbyl substituent is preferably derived from a polyisobutene (PIB). There may be used to advantage highly reactive PIBs, that is PIBs wherein greater than 50%, preferably greater than 65%, more preferably greater than 80% of the residual olefinic double bonds are of the vinylidene type, i.e. represented by the formula:

$$—CH_2—C(CH_3)=CH_2 \qquad (I)$$

Highly reactive PIBs are commercially available in the form of ULTRAVIS® from BP Chemicals Limited and GLISSOPAL® from BASF.

Alternatively, there may be used PIBs wherein less than 50% of the olefin double bonds are of the vinylidene type. These, too, are commercially available as HYVIS® from BP Chemicals Limited, amongst others. Mixtures of PIB types and molecular weights may also be used in the derivation of the acyclic hydrocarbyl substituent. It is preferred to use a mixture of a PIB having a molecular weight in the range from 750 to 1500 with up to 40% by weight of a PIB having a molecular weight greater than 1500, for example up to 5000, typically about 2400.

Alternatives to PIBs include isoprene-butadiene, styrene-isoprene or styrene-butadiene block copolymers such as those disclosed in WO 96/40846, or ethylene-propylene and ethylene-butene-1 copolymers having molecular weights from 1500 to 2500 or 7500, as disclosed in US 5567344 and U.S. Pat. No. 5,578,237. Mixtures of all the above may also be employed.

Acyclic hydrocarbyl-substituted succinic acylating agents include the hydrocarbyl-substituted succinic acids, the hydrocarbyl-substituted succinic anhydrides, the hydrocarbyl-substituted succinic acid halides, and the esters of the hydrocarbyl-substituted succinic acids, anhydrides or halides and lower alcohols, for example $C_1$ to $C_6$ alcohols, that is hydrocarbyl-substituted compounds which can function as carboxylic acylating agents. Of these compounds the hydrocarbyl-substituted succinic acids and the hydrocarbyl-substituted succinic anhydrides and mixtures of such acids and anhydrides are preferred. More preferred are the hydrocarbyl-substituted succinic anhydrides, in particular PIB succinic anhydrides (PIBSAs).

The succinic acylating agent is preferably made by reacting a polyolefin as described hereinbefore at elevated temperature with maleic anhydride. As an alternative to maleic anhydride there may be used, for example, maleic acid, fumaric acid, malic acid, itaconic acid, itaconic anhydride, and the like. Where the polyolefin (e.g. PIB) is a polyolefin wherein less than 50% of the olefin double bonds are vinylidene, the succination is often carried out in the presence of chlorine; in this case the reaction can be carried out in 2 steps, the first step being the chlorination of the polyolefin, the second step being the reaction of the chloro derivative with the maleic anhydride or like product.

The succinimide is prepared from a succinic acylating agent as described above and a polyamine which can be an alkylene polyamine. Suitable alkylene polyamines are those of the formula:

$$HR^2N(R^1NH)_xR^1NH\ R^3 \qquad (II)$$

wherein $R^1$ is an alkylene moiety of 2 to 10 carbon atoms, $R^2$ and $R^3$ are independently either hydrogen, alkyl groups, preferably $C_1$ to $C_6$ alkyl groups, more preferably methyl or ethyl, or hydroxyalkyl, preferably $C_1$ to $C_6$ hydroxyalkyl and x is an integer in the range from 0 to 10. The alkylene moiety $R^1$ preferably has from 2 to 6 carbon atoms and is more preferably either ethylene or propylene or a mixture thereof. $R^2$ and $R^3$ in the formula (11) are preferably both hydrogen. x preferably is equal to or greater than 2. Examples of alkylene polyamines having the formula (II) include diethylene triamine, triethylene tetramine, tripropylene tetramine, tetraethylene pentamine, tetrapropylene pentamine and pentaethylene hexamine. A preferred alkylene polyamine is tetraethylene pentamine. Other alkylene polyamines include mixtures of the above such as E-100® (obtainable from Dow Chemicals), HEPA® (obtainable from Delamine) and HPAX® (obtainable from Union Carbide). Cyclic polyalkylene amines may also be used. Alternatively, instead of the alkylene polyamine there may be used one or more polyoxyalkylene polyamines having the formula:

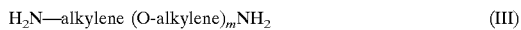

$$H_2N\text{---alkylene (O-alkylene)}_m NH_2 \qquad (III)$$

where m has a value of about 3 to 70, preferably 10 to 35.

The polyoxyalkylene polyamines of the formula (III), may suitably have average molecular weights ranging from about 200 to about 4000, preferably from about 400 to about 2000. Preferred polyoxyalkylene polyamines include the polyoxyethylene and polyoxypropylene diamines and the polyoxypropylene triamines having average molecular weights of from about 200 to 2000. The polyoxyalkylene polyamines are commercially available and may be obtained, for example, from the Jefferson Chemicals Company Inc. under the trade name JEFFAMINES®, e.g. D-230, D-400, D-1000, D-2000, T-403 etc.

As component (i) of polymer (B), suitable monoethylenically unsaturated dicarboxylic acids or anhydrides thereof include those having 4 to 6 carbon atoms, such as maleic acid, fumaric acid, itaconic acid, mesaconic acid, methylenemalonic acid, citraconic acid, maleic anhydride, itaconic anhydride, citraconic anhydride, methylenemalonic anhydride and mixtures thereof Maleic anhydride is most preferred.

Component (ii) of polymer (B) may be an oligomer of propene, isobutene or of branched isomers of pentene, hexene, octene or decene, in each case there being a terminal vinyl, vinylidene or alkylvinylidene group. Preferred are polyisobutenes (PIBs), as described above in connection with succinimides. Alternatives to PIBs as also described above may be used.

Component (iii) of the polymer is a fatty acid, glycerol ester, or oil containing at least 30% of the acid or ester. The fatty acid, or at least one acid residue in the glycerol ester, is preferably a $C_{12}$–$C_{22}$ unsaturated acid having from 1 to 6 carbon-carbon double bonds. The acid preferably has two to four double bonds, and is preferably conjugated. The acids may contain —OH groups in addition to the carboxyl group, and may be branched; they may also be cyclic. The esters are preferably tri-esters.

Particularly preferred acids include undecylenic acid, myristoleic acid, palmitoleic acid, oleic acid, gadoleic acid, elaidic acid, cis-eicosenoic acid, erucic acid, nervonic acid, 2,4-hexadienoic acid, linoleic acid, 11,14-eicosadienoic acid, linolenic acid, cis-8,11,14-eicosatrienoic acid, arachidonic acid, cis-5,8,11,14,17-eicosapentenoic acid, cis-4,7,10,13,16,19-docosahexenoic acid, all-trans-retinoic acid, ricinoleic acid lauroleic acid, eleostearic acid, licanic acid, citronelic acid, nervonic acid, abietic acid, and abscisic acid. Most preferred acids are palmitoleic acid, oleic acid, linoleic acid, linolenic acid, licanic acid, eleostearic acid, licanic acid and ricinoleic acid.

Preferred oils include tung oil, cotton oil, groundnut oil, linseed oil, olive oil, corn oil, palm oil, castor oil, rapeseed oil (low- and high-erucic), soyabean oil, sunflower oil, herring oil, sardine oil, grapeseed oil, oiticica oil, safflower oil, tall oil, dehydrated castor oil, rosin and tallow, plus also mixed vegetable oils. Particularly preferred oils are tung oil, groundnut oil, rapeseed oil and dehydrated castor oil. Mixtures of oils or acids may also be used: a mixture of 20 wt % dehydrated castor oil and 80 wt % rapeseed oil is particularly preferred.

Preferred amounts of components (i), (ii) and (iii) of the polymer (B) are 40–60 wt % of (i), 20–40 wt % of (ii) and 25–45 wt % of (iii). The molecular weight 20 $M_w$ of the polymer can vary considerably between about 1000 and 100000.

In a further aspect the invention provides a process for producing a polymer (B) as defined above, which comprises mixing together components (i) and (ii) in the presence of a radical catalyst at elevated temperature, and then adding successive portions of components (i), (ii) and (iii) plus catalyst at elevated temperature.

Suitable radical catalysts for the reaction include peroxide compounds such as tert-butyl perpivilate, tert-butyl perneodecanoate, tert-butyl perethylhexanoate, tert-butyl perisobutyrate, tert-butyl peroxide, tert-amyl peroxide, diacetyl peroxydicarbonate and dicyclohexyl peroxydicarbonate. Preferred is tert-butyl peroxide. The catalyst is generally present in an amount of up to 10% by weight based on total monomer content, preferably from 0.2 to 5 wt %.

A suitable temperature for the reaction is 80 to 300° C., perferably 100 to 200° C.

The invention also provides a process for producing a reaction product of amine (A) and polymer (B) as defined above, which comprises reacting together at elevated temperature amine (A) and polymer (B), where polymer (B) has been made by the process described above.

Reactants (A) and (B) are preferably reacted in the presence of a normally liquid substantially inert organic solvent. Preferably the solvent is a high-boiling hydrocarbon solvent. Examples of suitable such solvents include higher carbon number paraffins and liquid polyolefins. In view of the intended use of the product it is preferred to employ as the solvent an oil of lubricating viscosity. Both natural and synthetic oils may be employed. Solvent neutral (SN) oils, for example SN150 oil, are the oils of choice.

In the case where reactant (A) is a succinimide, it may be added to polymer (B) as a pre-formed succinimide or as the precursors thereof, i.e. the acyclic hydrocarbyl substituted succinic acylating agent and a polyamine.

Any oil of lubricating viscosity may be used in the composition. Thus animal, vegetable or mineral oils may be employed. Mineral oils are preferred. Synthetic oils, including synthetic ester lubricating oils and polyolefins may also be used.

The finished lubricating oil composition may contain conventional additives, for example one or more of anti-wear additives, antioxidants, anti-rust additives, detergents, viscosity index improvers, and the like. It is an advantage of the present invention, however, that at least some of the VI improver additive conventionally present in lubricating oil compositions may be omitted. The conventional additives mentioned hereinbefore may be added either directly to the lubricating oil composition or to the concentrate composition.

The invention will now be further illustrated by reference to the following examples.

Preparation of polymer of maleic anhydride, polyisobutene and fatty oil or acid

A 1 liter round-bottomed flange flask was equipped with lid, clip, pressure equalising dropping funnel, thermocouple/ Eurotherm/mantle heating system, mechanical stirrer with PTFE gland and condenser set for reflux. The reaction was undertaken under a nitrogen blanket. The flask was charged with GLISSOPAL 1000 (300 g, 0.3 moles, 0.3 equivs.) and 47 g of the total fatty oil or acid charge (195.8 g, 0.7 moles (all acids/oils used in this reaction were given an assumed unit molecular weight of 280), 0.7 equivs.). The reaction was then heated to 150° C. under nitrogen with stirring. 0.7 g of the total t-butyl peroxide charge (6.3 g, 0.04 moles, 0.04 equivs.) was then added and the reaction held at 150° C. for 30 mins. 12.25 g of the total maleic anhydride charge (98g, 1 mole, 1 equiv.) plus 18.6 g of fatty acid/oil and 0.7 g of t-butyl peroxide were then added and the reaction heated for a further 30 mins at 150° C. This maleic anhydride/fatty acid or oil/t-butyl peroxide addition step was then repeated with the same amounts for a further 7 times. After the final hold for 30 minutes at 150° C. the reaction mixture was either poured straight into jars or a sample taken for GPC analysis for molecular weight, PIBSA number and residual maleic anhydride content, and sufficient SN150 lubricating oil added to the rest to make a 75% solution of terpolymer in lubricating oil.

Preparation of succinimide

The apparatus described in Example 1 above was set up (except with the condenser in distillation mode) and charged with the prewarmed polyisobutene succinic anhydride (PIBSA) (prefiltered and diluted with lubricating oil to form a ~65% solution in lubricating oil), then heated to 170° C. The amine was then added dropwise, via the dropping funnel. The precise amount to be added calculated from PIBSA no. of the PIBSA and the molar ratio shown below. Once addition was complete, the reaction was heated at 175° C. for 4 hours and any water of reaction collected. Full vacuum (0.04 bar) was then carefully applied until no more water was collected. The product was allowed to cool and then stored.

Specific succinimides prepared were as follows:

TABLE 1

| Succinimide | PIB type in the PIBSA | Mole ratio amine:PIBSA | Amine used |
|---|---|---|---|
| A | 40% Glissopal 1000 + 60% Glissopal 2300 | 0.33 ("tris") | Triethylene tetramine (TETA) |
| B | 40% Glissopal 1000 + 60% Glissopal 2300 | 0.5 ("bis") | Triethylene tetramine (TETA) |
| C | 40% Glissopal 1000 + 60% Glissopal 2300 | 0.87 ("mono") | Triethylene tetramine (TETA) |
| D | 40% Glissopal 1000 + 60% Glissopal 2300 | 0.87 ("mono") | Tetraethylene pentamine (TEPA) |
| E | Glissopal 2300 | 0.5 ("bis") | Heavy amines (HPAX) |
| F | Hyvis 10 | 0.87 ("mono") | "TEPA" |
| G | Hyvis 10 | 0.5 ("bis") | Triethylene tetramine (TETA) |

Reaction (post-treatment) of succinimide with polymer

The apparatus was set up as in the above Examples except on a 500 ml scale and without condenser. It was charged with polymer (50 g of a 75% solution in SN 150 lubricating oil) and the succinimide (200 g of a ~65% solution in SN150 lubricating oil) and heated at 150° C. for 3 hours. The apparatus was left open to the atmosphere to allow water of reaction to escape. Once cooled and discharged, the post-treated product was measured for nitrogen and AV.

Polymers of Glissopal 1000 or 2300, various oils and maleic anhydride in the mole ratio 0.3:0.7:1 were prepared. Each of the above-mentioned succinimides was post-treated with 15 wt % of each polymer as a 75% solution in SN150 oil, and viscometrics measured in a commercial 15W-40 engine oil package where the standard dispersant was replaced by an equivalent weight of the post-treated succinimide. The fatty acids were obtained from Seatons in Hull (a division of Croda) except for oleic acid, Tung and Safflower oils (from Aldrich) and Dehydrated (D.H.) Castor oil (from Akzo-Nobel).

Results of measured viscosities at 100° C. and −15° C. are given in Table 2 below. As a comparison, results are given for the unreacted succinimide, and also for a succinimide reacted with a polymer in which the fatty acid/oil is replaced by a $C_{20-22}$ α-olefin.

A pass/fail indication is also given for the VW PV 3344 seal swell test, a standard test designed to measure the effect of oils on seals, passing of which is required for all high-quality engine oils sold in Europe. Only some of the formulations below were subjected to this test.

TABLE 2

|  | Succinimide A | | Succinimide B | | Succinimide C | | Succinimide D | | Succinimide E | | Succinimide F | | Succinimide G | |
|---|---|---|---|---|---|---|---|---|---|---|---|---|---|---|
| Acid/oil in terpolymer | $V_{100}$ cSt | $V_{-15}$ cP | $V_{100}$ cSt | $V_{-15}$ cP | $V_{100}$ cSt | $V_{-15}$ cP | $V_{100}$ cSt | $V_{-15}$ cP | $V_{100}$ cSt | $V_{-15}$ cP | $V_{100}$ cSt | $V_{-15}$ cP | $V_{100}$ cSt | $V_{-15}$ cP |
| No terpolymer | 13.5 | 2283 | 13.8# | 3320 | 14.0# | 3400 | 14.7# | 3500 | 13.7# 3042 (# = borderline fail) | | 13.1 | 2936 | 12.6 | 2745 |
| $C_{20-22}$ α-olefin | — | — | 14.6 | 2950 | 15.8 | 2730 | 23.2 | 2800 | 13.8 | 2772 | — | — | — | — |
| Groundnut oil | 13.6 | 2686 | 13.9^ | 2778 | 16.0 | 2835 | 14.1 | 2931 | 14.2^ | 2765 | 13.7 | 2733 | 12.7 | 2449 |
| Groundnut oil* | 13.7 | 2896 | 14.1 | 2983 | — | — | 15.1 | 3159 | 14.0 | 2936 | 13.4 | 2844 | — | — |
| Oleic acid* | — | — | 13.7 | 2999 | 13.9 | 3013 | 14.0 | 3070 | 13.7 | 2905 | — | — | — | — |
| Tung oil* | 13.8 | 2757 | 14.9 | 3039 | — | — | — | — | 14.7 | 3011 | 13.9 | 2857 | — | — |
| Tung oil | 14.2 | 2844 | 14.7^ | 2875 | 15.5# | 2900 | 16.6# | 3114 | 14.3^ | 2753 | — | — | 13.5 | 2429 |
| Safflower oil | — | — | 14.4 | 2997 | — | — | — | — | 13.6^ | 2832 | — | — | — | — |
| 20% dehydrated castor/80% rapeseed oil | 14.4 | 2618 | 15.2^ | 2844 | — | — | — | — | 15.5^ | 2686 | 16.3 | 2652 | 13.5 | 2449 |

*Polymer made with Glissopal 2300 instead of Glissopal 1000.
^Passed seal swell test
Failed seal swell test The higher the viscosity at 100° C. and the lower the viscosity at −15° C. the better the viscometrics of the product. Raising the viscosity of the oil package at 100° C. by as little as 1 cSt can allow significant changes to be made to the formulation whilst maintaining acceptable viscosity.

The results in the Table above show that use of the reaction product of the succinimides and the polymer of the invention results in notable improvements in viscosity performance, particularly at low temperature, compared with use of the succinimides alone. The performance of the reaction product of succinimide and $C_{20-22}$ α-olefin is at least matched in most cases, and in some instances bettered. One advantage of fatty oils such as those used above is their relative abundance and cheapness compared with most chemicals such as olefins; thus merely matching the performance of the olefin can provide a significant benefit. Use of the reaction product rather than the succinimides alone also improves the performance in the seal swell test, which several of the succinimides fail.

We claim:

1. An additive comprising the reaction product of component (A) with component (B),
   component (A) being an amine of the formula $HNR^1R^2$, where $R^1$ and $R^2$ are each independently H, an aliphatic or aromatic hydrocarbon radical, an aminoalkylene or polyaminoalklene radical, a hydroxyalkylene radical, a polyoxyalkylene radical optionally carrying terminal amino groups, or a heteroaryl or heterocyclyl radical optionally carrying terminal amino groups, or a heteroaryl or heterocyclyl radical optionally carrying terminal amino groups; or together with the N to which they are bonded, $R^1$ and $R^2$ form a ring optionally containing further heteroatoms; or the reaction product of said amine with an acyclic hydrocarbyl substituted succinic acylating agent; and
   component (B) being a compound derived from components (i), (ii) and (iii), said components (i), (ii) and (iii) being as follows
   i) 20–80 mol % of at least one monoethylenically unsaturated dicarboxylic acid or anhydride thereof,
   ii) 5–30 mol % of at least one unsaturated oligomer of an optionally branched olefin having 2 to 20 carbon atoms, having an average molecular weight of 300–5000, and
   iii) 10–60 mol % of an oil selected from the group consisting of tung oil, cotton oil, groundnut oil, linseed oil, olive oil, corn oil, palm oil, castor oil, rapeseed oil, soyabean oil, sunflower oil, herring oil, sardine oil, grapeseed oil, oiticica oil, safflower oil, tall oil, dehydrated castor oil, rosin, tallow, mixed vegetables oils, and mixtures thereof.

2. An additive according to claim 1 wherein component (B) is derived from 40–60 wt % of component (i), 20–30 wt % of component (ii) and 25–45 wt % of component (iii).

3. An additive according to claim 1 wherein component (B) has a molecular weight between 1000 and 100000.

4. An additive according to claim 1 wherein component (A) is a succinimide prepared from an acyclic hydrocarbyl substituted succinic acylating agent and a polyamine, the hydrocarbyl substituted succinic acylating agent being prepared by reacting a polyolefin and an acylating agent under conditions such that at least 75 mole % of the starting polyolefin is converted to the hydrocarbyl-substituted succinic acylating agent.

5. An additive according to claim 1 wherein component (A) is a succinimide prepared from an acyclic hydrocarbyl substituted succinic acylating agent and a polyamine, the hydrocarbyl substituted succinic acylating agent being prepared by reacting a polyolefin and an acylating agent, wherein the polyolefin is a homopolymer or copolymer having a number average molecular weight in the range from about 500 to about 5000, the olefin having from 2 to 1 6 carbon atoms.

6. An additive according to claim 1 wherein component (A) is a succinimide prepared from an acyclic hydrocarbyl substituted succinic acylating agent and a polyamine, the acyclic hydrocarbyl-substituted succinic acylating agent being a hydrocarbyl-substituted succinic acid, anhydride, or halide, or an ester thereof with a C, to $C_6$ alcohol.

7. An additive according to claim 1 wherein component (A) is a succinimide prepared from an acyclic hydrocarbyl substituted succinic acylating agent and a polyamine, and the polyamine is an alkylene polyamine of the formula $HR^2N(R^1NH)_xR^1NHR^3$ wherein $R^1$ is an alkylene moiety of 2 to 10 carbon atoms; $R^2$ and $R^3$ are independently either hydrogen or alkyl groups or hydroxyalkyl groups and x is an integer in the range from 0 to 10.

8. A process for making the compound (B) as defined in claim 1, which comprises mixing together components (i) and (ii) in the presence of a radical catalyst at elevated temperature in the range of 80 to 300° C., said radical catalyst being a peroxide compound, and then adding successive portions of components (i), (ii) and (iii) plus catalyst at said elevated temperature.

9. A lubricating oil composition comprising a lubricating base oil and the additive of claim 1.

* * * * *